United States Patent [19]

Griesbach

[11] 4,160,326

[45] Jul. 10, 1979

[54] THICKNESS RESPONSIVE BLANK GAUGE

[75] Inventor: Melbourne L. Griesbach, Muskegon, Mich.

[73] Assignee: E.M.F., Inc., Muskegon, Mich.

[21] Appl. No.: 865,899

[22] Filed: Dec. 30, 1977

[51] Int. Cl.$^2$ .......................... G01B 5/02; G01B 5/06
[52] U.S. Cl. ................................ 33/174 R; 33/147 E
[58] Field of Search ............. 33/174 R, 172 R, 125 R, 33/147 R, 143 R, 147 E, 147 G, 143 M, 172 B, 148 G, 179.5 R

[56] References Cited

U.S. PATENT DOCUMENTS

| | | | |
|---|---|---|---|
| 2,820,300 | 1/1958 | Gadomski | 33/147 E |
| 3,237,442 | 3/1966 | De Vos | 33/179.5 R |
| 3,323,217 | 6/1967 | Russell et al. | 33/147 R |
| 3,978,589 | 9/1976 | Courtepattie et al. | 33/143 R |

Primary Examiner—Richard R. Stearns
Attorney, Agent, or Firm—Price, Heneveld, Huizenga & Cooper

[57] ABSTRACT

A thickness responsive blank gauge is disclosed for comparing the thickness and length of a flat blank to a standard blank. The gauge includes a thickness sensor positioned by the blank and an output indicator engaged by the thickness sensor. Operably associated with the output indicator is a device for shifting the output indicator a distance equal to the change in length from the standard times the reciprocal of a predetermined constant. The output indicator will shift a distance equal to the distance through which the thickness sensor moves if the ratio of the change in length of the blank from the predetermined standard to the change in thickness of the blank from the predetermined standard is equal to the predetermined constant.

17 Claims, 4 Drawing Figures

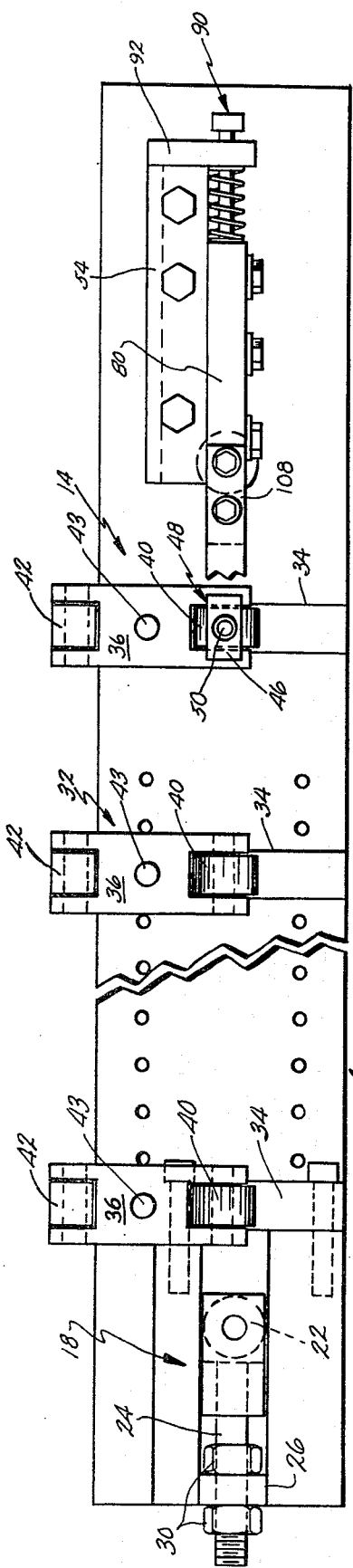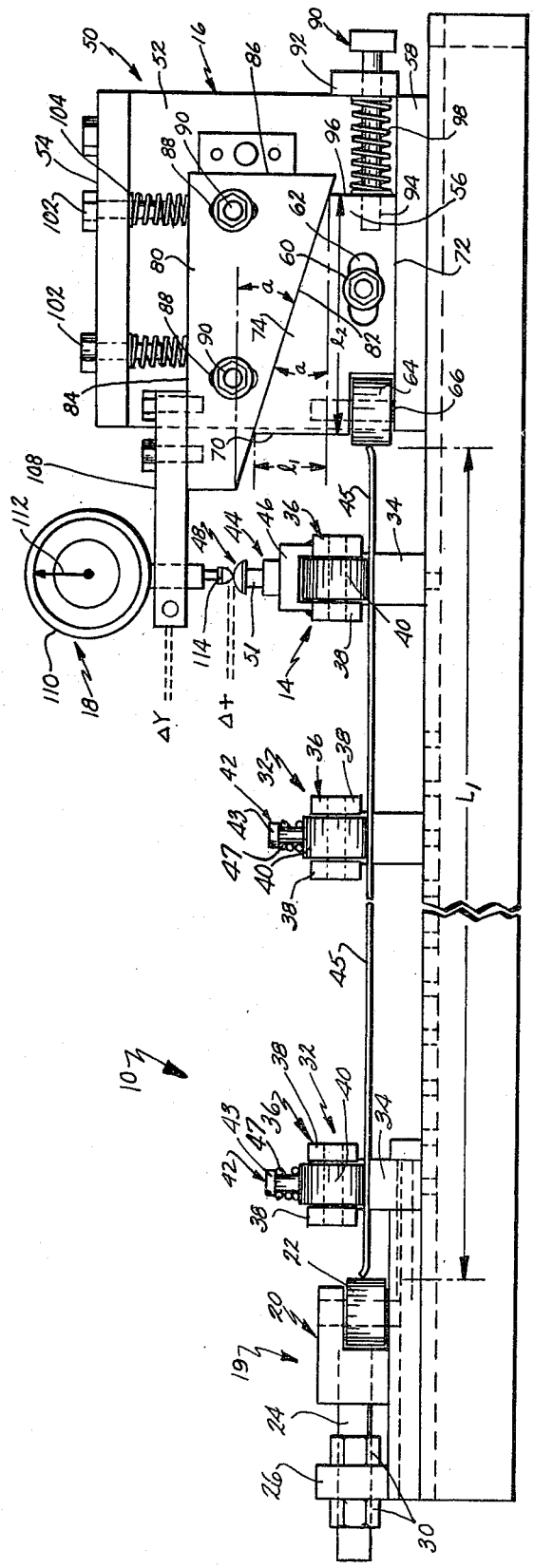

THICKNESS RESPONSIVE BLANK GAUGE

BACKGROUND OF THE INVENTION

This invention relates to blank gauges and more particularly to a unique thickness responsive blank gauge for indicating if a generally flat blank will properly wrap to a cylindrical shape of a predetermined inner diameter.

Heretofore, various problems have been experienced in the manufacture of electric motor shells. General industry practice has been to roll precut lengths of sheet metal into cylindrical form with the ends of the rolled sheet metal being welded. The internal diameter of the resulting cylindrical motor shell must be maintained within exact tolerances in order to permit the field laminations with electric motors to be press fit within the shell and to prevent distortion of the field laminations which result in defective motor operation.

In commonly owned U.S. Pat. No. 3,732,614 to Boutell, entitled METHOD FOR MAKING MOTOR SHELLS AND THE LIKE and issued May 15, 1973, an apparatus and method are disclosed for precisely forming cylindrical motor shells from flat blanks of sheet metal. A precisely dimensioned and precision-ground forming arbor or mandrel is used to produce the shells by wrapping individual precut lengths of sheet metal of an appropriate width around the forming arbor. Since the forming arbor has a diameter equal to the predetermined diameter of the field laminations for the electric motor, the cylindrically shaped motor shells will possess the required internal diameter and have accurate circularity.

The sheet metal stock from which the blanks are precut is typically supplied by manufacturers with a specified nominal thickness. The actual thickness of the individual cut blanks often varies within the tolerances allowed by the sheet metal manufacturers. This variance in thickness results in significant problems in the manufacture of motor shells. Variances in the thickness of the sheet metal blanks when wrapped around a precisely dimensioned arbor result in variance of the weld gap between the ends of the rolled or wrapped blank. If the thickness decreases from a nominal, stock thickness, the gap will decrease and the ends of the wrap blank may in fact overlap. If the thickness of the blank increases from the standard nominal thickness, the gap between the ends of the blank will increase thereby preventing an effective weld.

In U.S. Pat. No. 4,046,039 to the herein named inventor, entitled THICKNESS RESPONSIVE VARIABLE POSITION DIE SET and issued on Sept. 6, 1977, there is disclosed an apparatus for cutting metal or other sheet stock to a particular length which is determined by the stock thickness. The apparatus disclosed therein includes a stationary cutting block, a movable cutting block, stock thickness sensing apparatus and a bellcrank multiplier device for positioning the movable cutting block as a function of the sensed stock thickness. The variable position die set disclosed therein compensates for the variance in the thickness from a nominal or standard thickness and cuts the stock sheet to a cut length equal to the predetermined internal circumference plus pi times the thickness of the sheet.

Since the internal circumference of the cylinder must be capable of receiving a particular size of electric motor stator, having a given external diameter D, the cut length may be defined by the following equation:

$$L = \text{pi}(D+T)$$

Since the initial thickness or nominal thickness T of any sheet metal stock will vary and the internal circumference of the resultant shell must be maintained constant, the relationship between the initial cut length L and subsequent cut lengths may be defined as follows:

$$L_2 = L + \text{pi}\Delta T$$

where $\Delta T$ equals the change in thickness between the different blanks. After initial calibration, the apparatus disclosed in the aforementioned patent will shift the movable cutting die set a distance proportional to pi times the change in thickness of subsequent sheets.

A need exists, however, for a relatively inexpensive and simple gauge which is capable of comparing a generally, flat blank from which the electric motor shells will be formed to a predetermined standard blank in order to determine if the cut length has been accurately determined. Such a gauge would have utility in checking the accuracy of the variable position die set disclosed in applicant's aforementioned patent and also in checking sheet metal blanks cut by more conventional techniques such as are disclosed in the aforementioned patent to Boutell.

SUMMARY OF THE INVENTION

In accordance with the present invention, a thickness responsive blank gauge is provided for comparing the thickness and length of a flat blank to a standard blank to determine if the length of the blank is equal to the standard length plus a constant times the change in thickness from the standard blank. Essentially, the thickness responsive blank gauge includes means for sensing the thickness of the blank and means operatively associated with the thickness sensing means for sensing the change in length of the blank from the predetermined standard and comparing this change in length to the sensed thickness to determine if the change in length equals the change in thickness from the standard times a predetermined constant.

Initially, the blank gauge is calibrated by placing the standard blank therein and "zeroing" the means for sensing the change in length and comparing the change in length to the sensed thickness. The blank to be checked is then inserted into the gauge resulting in a shift in the thickness sensing means and a corresponding change in position of the length sensing means. The length sensing means shifts an output means which is normally engaged by the thickness sensing means. If the shift in position of the thickness sensing means equals the shift in position of the output means, the gauge will read "zero" thereby indicating that the cut length of the blank is equal to the cut length of the standard blank plus a constant times the change in thickness between the two blanks.

BRIEF DESCRIPTION OF THE DRAWINGS

FIG. 1 is a side, elevational view of the thickness responsive blank gauge in accordance with the present invention;

FIG. 2 is a fragmentary, top plan view of the blank gauge;

DETAILED DESCRIPTION OF THE PREFERRED EMBODIMENT

Figure 3:
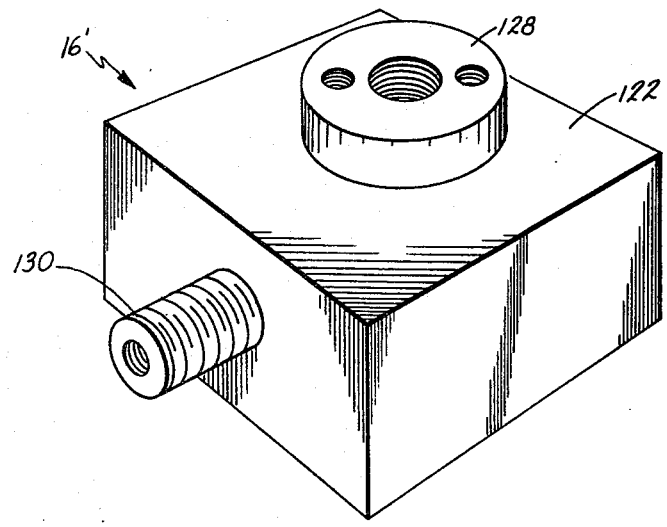
FIG. 3 is a perspective view of an alternative constant multiplier usable in the present invention.

A preferred embodiment of the thickness responsive blank gauge in accordance with the present invention is illustrated in the drawings and generally designated 10. The gauge includes a support base 12, a thickness sensing means 14, a constant multiplier means 16 and an output indicator means or transducer 18. The support base 12 may be fabricated from a length of channel and has supported on the upper surface thereof a stop 19. The stop 19 includes a block 20 supporting a blank abutment roller 22. The block 20 is laterally positionable along the support base 12 by an adjustment stud or bolt 24 extending through a block 26 secured to one end of the base. A pair of adjustment nuts 30 are positioned on the stud 24 on opposite sides of the block 26. As a result, the roller 22 may be adjusted within certain limits laterally or longitudinally of the support base 12 to accommodate standard blanks of varying length.

Also positioned on the upper surface of the support base 12 are a plurality of blank supports 32. Each blank support includes a lower block 34 extending transversely the width of the base 12, an upper block 36 having yoked arms 38 between which is rotatably supported a roller 40. The upper block 32 is positioned about a member 42 (FIG. 2) and a shouldered post, dowel or headed bolt 43 for vertical movement relative to the support block 34. A spring 47 around bolt 43 biases block 32 towards block 34 to hold the blank in the gauge. The blocks 34 therefore provide support for a blank 45 (FIG. 1). The roller 22 of the stop, the rollers 40 of the support portions and vertical portions 42 center and properly position the blank 45 on the support base 12 relative to the constant multiplier apparatus 16.

The thickness sensing means 14, in the embodiment, of FIGS. 1 and 2, includes a support block 34 and an upper block 36 similarly supporting a roller 40. Secured to the top of the upper block 36 and above the roller 40 is a thickness sensing output member 44. The output member includes a bridge piece 46 having legs welded or otherwise suitably secured to the yoke portion of the upper vertically movable member 36. An adjustable output element 48 in the form of a screw or bolt is threaded to the bridge piece 46. A lock nut 51 is provided to secure the adjustable member 48 in place.

The constant multiplier 16 includes a support frame or weldment 50 having a vertical member 52 and a top, horizontal member 54. A first slidable block or change of length sensing element 56 is slidably mounted on a pad 58 for longitudinal or lateral movement relative to the support base 12. The slidable block 56 is secured to the vertical member 52 by a suitable fastener 60 extending within a longitudinal slot 62. As a result, the block 56 is positioned for lateral movement only. A roller 64 is rotatably supported at one end of a block on a roller pin 66. The blank when inserted into the gauge will abut, engage or press against the roller 64. The block 56 is generally triangular in shape and includes a vertical side 70, a horizontal side 72 slidably engaging or riding on the plate 58 and a sloped or angled camming side or surface 74. The camming side or surface 74 assumes an angle "a" relative to the horizontal. The tangent of the angle "a", i.e. the ratio of the length $l_1$ over the length $l_2$ is equal to the reciprocal of the predetermined constant. When the gauge is used to check blank length for subsequent wrap around a mandrel of predetermined diameter, the tangent of the angle "a" is equal to the reciprocal of pi. In other words, the angle "a" is equal to 17.656°.

Positioned above the first block 56 for vertical movement is a second block or output block 80. The output block 80 is also generally triangular in shape and includes a cam follower surface 82. The cam follower surface 82 assumes an angle "a" downwardly from the horizontal which is equal to the angle "a" of the camming surface 74 of the first member 56. In other words, the camming surface 74 and the cam follower surface 82 are sloped at equal but opposite angles from horizontal. The second block 80 is a triangular shaped member which is supported for vertical movement only relative to the first block 56 and is positioned in a reverse relationship from the first block 56. Block 80 similarly includes a horizontal surface 84 and a vertical surface 86. Vertical slots 88 are formed through the block 80 and fasteners 90 secure the block for vertical movement on the vertical member 52 of the support weldment.

A spring guide 90 extends through a bore of a block 92 secured to the lateral edge of the vertical member 52. The threaded end of the guide 90 is threadably received within a threaded bore 94 formed in side 96 of block 56. A coil spring 98 disposed on the bolt 90 biases the block 56 to the left when viewed in FIG. 1. The bolt 90 acts as a stop and limits the range of sliding movement of block 56. A pair of bolts 102 extend through the upper horizontal plate 54 into suitable bores formed in the horizontal side 84 of the second block 80. A pair of coil springs 104 are disposed around the bolts 102 and bias the second block into engagement with the first block.

Secured to the horizontal side 84 of the second block and extending outwardly therefrom is a support arm 108. Positioned on the free end of the support arm 108 is a conventional dial indicator 110. The dial indicator 110 includes an output needle 112 and an input plunger 114. The input plunger is positioned directly above the output element 48 of the thickness sensing means 14. The plunger 114 is normally contacted by the output element 48.

As set forth above, the cut length of a blank when used for fabricating electric motor shells is dependent upon the thickness of the blank. A cut length for a given thickness of generally flat sheet material would be equal to the sum of the quantities pi times the given internal diameter for the motor shell plus pi times the thickness. As the thickness varies from nominal, the cut length of the material must also vary from a standard sheet. This increase or decrease in cut length is equal to the cut length of the standard sheet plus the quantity pi times the change in thickness.

In use, a standard blank having a known thickness and cut length is positioned within the gauge. One end will abut the stop roller 22 and the other end will abut the roller 64 of the constant multiplier 16. The thickness sensing means 14 will move the output member 48 vertically and the opposite end of the blank will position the first block 56. The first block 56 will shift the second block and position the output indicator 18. The dial indicator 110 is then "zeroed" by positioning the indicator relative to arm 108 and/or adjusting output member 48 of the thickness sensing means.

The blank to be checked and compared to the standard blank to determine if the aforementioned cut length formula is met is then inserted into the gauge. One end will abut the stop roller 22 which serves as a reference point and the opposite end will abut the roller 64 and shift the block 56. If the length of the generally flat blank is greater than the standard length, the block will shift to the right which in turn will shift the upper block 80 vertically to a position $y_1$. The upper block and the support arm 108 will therefore shift a distance equal to $\Delta y$ where $\Delta y$ equals $y_1-y_0$ and $y_1$ is the final position and $y_0$ is the initial position assumed with the standard blank in place. The block 56 will have been shifted to the right a distance equal to $\Delta L$ where $\Delta L$ equals $L_1-L_0$ or the new blank length minus the standard blank length. Since the tangent of the angle of the camming surface 74 and cam follower surface 82 is equal to the reciprocal of pi, the output arm 108 will be shifted vertically a distance $\Delta y = (1/pi) \Delta L$. The thickness sensing means will have shifted vertically a distance $\Delta T$ which is equal to the thickness of the new blank minus the thickness of the standard blank. If the distance $\Delta T$ sensed by the thickness sensing means is equal to $\Delta y$, the dial indicator will read "zero", thereby indicating that the new blank conforms to the aforementioned cut length relationship. As is clear from the previous formula, the change in length from the standard blank to the cut blank must be equal to pi times the change in thickness in order for the blank to properly wrap around the given mandrel. If the thickness length relationship of the gauged blank does not correspond to the desired relationship, the dial indicator will not read "zero", thereby indicating that the gauged blank is unacceptable.

The thickness responsive gauge in accordance with the present invention is therefore capable of comparing the thickness and length relationship of a blank to a predetermined standard thickness and length relationship in order to determine if the length and thickness of the blank are proportional to the constant. Although the present invention has been illustrated and described in the context of a gauge to indicate the correct cut length for a blank sheet which is subsequently wrapped around a constant diameter mandrel, it could be used to compare cut blanks to a standard blank wherein the desired cut length is proportional to a constant other than pi. All that is necessary is to form the first sliding block 56 so that the tangent of the angle "a" is equal to the reciprocal of the desired, predetermined constant. The present invention therefore provides a simple device for quickly and accurately checking the proper cut length of a blank to determine if a given relationship to thickness has been obtained.

Figure 4:
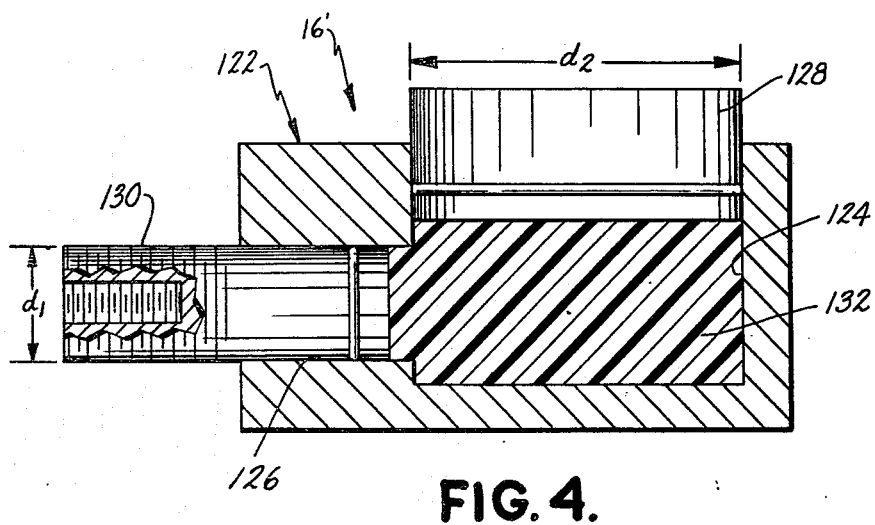
FIG. 4 is a side, elevational view in section of the constant multiplier of FIG. 3.

An alternative embodiment for the multiplier 16 is illustrated in FIGS. 3 and 4 and generally designated 16'. The alternative constant multiplier is directly substitutable into the gauge blank illustrated in FIGS. 1 and 2. The constant multiplier 16' includes a block 122 which defines a first bore 124 and a second bore 126 intersecting said first bore at a right angle thereto. Slidably positioned within the first bore 124 is a first, circular piston 128 having a diameter $d_2$. Slidably positioned within the second bore 126 is a second, circular piston 130 having a diameter $d_1$. The space between the pistons 128, 130 is filled with a incompressible medium 132. As a result, motion of the piston 128 will be transmitted through the medium 132 to cause motion of the piston 130 (or vice versa). The ratio of the area of the piston 128 to the area of the piston 130 is equal to the predetermined constant. An incremental movement inwardly of the piston 130 a distance $\Delta L$ will result in an incremental vertical movement of the piston 128 a distance $\Delta Y$ equal to the reciprocal of the constant times $\Delta L$. Therefore, the constant multiplier 16' may be substituted for the multiplier 16 illustrated in FIGS. 1 and 2 by placing the piston 130 in position to be abutted by the gauged blank and by securing the support arm 108 to the piston 128. The piston 128 must be biased downwardly by a suitable spring to insure movement and transmission of movement in both directions. A suitable coil spring engaging the top surface of piston 128 mounted as shown in FIG. 1 may be used. The incompressible medium 132 disposed within the cavity defined by the bores 124 and 126 may take the form of a hydraulic fluid. However, when a hydraulic fluid is employed, the pistons must be sealed within their bores. Therefore, it is presently preferred that an incompressible elastomer material be used for the medium 132. An incompressible elastomeric material eliminates the need for sealing the pistons within the bores. The pistons 128 and 130 may be provided with suitable threaded bores and external threading to permit easy attachment of other elements of the device within which the multiplier is used.

The constant multipliers 16 and 16' illustrated herein in the context of a blank gauge may also be directly substituted for the bellcrank constant multiplier structure illustrated in applicant's aforementioned U.S. patent wherein the variable position die set is disclosed. When used therein the output members 80, 128 respectively would be positioned to be input members.

The constant multipliers 16 and 16' are capable of greater accuracy then the lever or bellcrank multiplier disclosed in the aforementioned U.S. patent. The incompressible motion transmitting medium reduces error which is inherent in or related to the use of a lever passing through an arc as in the prior bellcrank type constant multiplier. The sliding block multiplier reduces error through the more easily obtainable accurate angling of the camming surfaces.

The present invention therefore provides a relatively simple, easily manufactured and easily used guage for accurately checking the relationship between cut length or developed length and thickness of a generally flat blank. When used to check blanks in the manufacture of motor shells, the gauge indicates that the blank will provide the required weld gap when subsequently wrapped around a given mandrel. It should be noted that the relationship between cut length and the standard length for the blank applies even if the blank is not wrapped around a circular mandrel. This relationship applies if the blank is wrapped into a rectangular configuration. The pi proportionality applies when the blank is wrapped into any configuration wherein the sum of the inside angles equals 360° and the blank is bent at curved radii i.e. the radius between adjacent sides is not less than the thickness of the blank.

In view of the foregoing description, those of ordinary skill in the art will undoubtedly envision various modifications to the present invention which would not depart from the inventive concepts disclosed herein. Therefore, it is expressly intended that the above description should be considered only as that of the preferred embodiments. The true spirit and scope of the present invention will be determined by reference to the appended claims.

The embodiments of the invention in which an exclusive property or privilege is claimed are defined as follows:

1. A thickness responsive blank gauge for comparing the thickness and length of a flat blank to a standard blank having a predetermined length and thickness to determine if the length of the blank is equal to the standard length plus a predetermined constant times the change in thickness from the standard blank, said gauge comprising:

means for sensing the thickness of said blank; and
means operatively associated with said thickness sensing means for sensing the change in length of said blank from said standard and comparing the change in length to the sensed thickness to determine if the change in length equals the change in thickness from the standard times a predetermined constant, said means associated with said thickness sensing means comprising:
a first member engaged by said blank and shiftable laterally a distance equal to the change in length from said standard;
a second member operatively associated with said first member and shiftable a distance equal to the change in length times the reciprocal of said predetermined constant; and
output means carried by said second member for indicating when the distance of shift of said second member equals the change in thickness of said blank from said standard.

2. A thickness responsive blank gauge as defined by claim 1 wherein said means for sensing thickness comprises a third member supported above said blank for vertical movement from an initial position corresponding to the thickness of the standard blank to a final position corresponding to the thickness of said blank.

3. A thickness responsive blank gauge as defined by claim 2 wherein said output means comprises a dial indicator supported by said second member and including a plunger in engagement with said third member.

4. A thickness responsive blank gauge as defined by claim 3 wherein said first member comprises a triangular block having a vertical side, a horizontal side and an angled camming side connecting said vertical and horizontal sides; and said second member comprises another triangular block superimposed over said first member and having an angled cam follower surface riding on the camming surface of said first member.

5. A thickness responsive blank gauge as defined by claim 4 wherein said camming surface and said cam follower surface are sloped at equal but opposite angles from horizontal.

6. A thickness responsive blank gauge as defined by claim 2 wherein said first member comprises a circular piston having a first area, said second member comprises a second circular piston having a second area, the ratio of said first area to said second area being equal to the reciprocal of said predetermined constant and wherein said means associated with said thickness means further includes an incompressible fluid like means between said pistons for shifting said second piston in response to a shift of said first piston so that shifting of said first piston a distance equal to the change in length from said standard shifts said second piston a distance equal to the reciprocal of said constant times the change in length.

7. An apparatus for comparing the length and thickness of a blank to the length and thickness of a standard blank to indicate if the difference in thicknesses between said blank and said standard blank equals a constant times the difference in length between said blank and said standard blank, said apparatus comprising:

a support base having a stop at one end, said base supporting said blank, said stop being a reference point against which one end of the blank abuts;
thickness sensing means mounted for vertical movement on said base for sensing the thickness of said blank, said thickness sensing means engaging the upper surface of said blank;
laterally shiftable means supported on said base and engaged by the end of said blank opposite said stop so as to be shifted laterally a distance equal to the change in length of the blank from the standard blank for sensing said change in length; and
means operatively associated with said laterally shiftable means and said thickness sensing means for indicating if the sensed change in length equals the change in thickness of said blank from said standard times the constant.

8. A thickness responsive blank gauge as defined by claim 7 further including means for defining a chamber, an incompressible motion transmitting material within said chamber, and wherein said laterally shiftable means comprises a first piston extending into said chamber and having a first area, and wherein said indicating means includes a second piston extending into said chamber perpendicular to said first piston and having a second area, the ratio of said first area to said second area being equal to the reciprocal of said constant.

9. A thickness responsive blank gauge as defined by claim 8 wherein said constant is equal to pi.

10. A thickness responsive blank gauge as defined by claim 7 wherein said laterally shiftable means comprises a block having the shape of a right triangle, said block including a vertical side engaged by said blank, a horizontal side sliding on said support base and a sloped side, the tangent of the angle between said sloped side and said horizontal side being equal to the reciprocal of the constant.

11. A thickness responsive blank gauge as defined by claim 10 wherein said indicating means comprises another block having the shape of a right triangle superimposed on said a block and including a sloped side angled downwardly from horizontal at an angle equal to the upward angle of said sloped side of said a block, said sloped sides being in sliding contact.

12. A thickness responsive blank gauge as defined by claim 11 wherein said constant is equal to pi.

13. A gauge for indicating if the ratio of the change in length to the change in thickness of a generally flat blank from the length and thickness of a standard blank is equal to a predetermined constant, said gauge comprising:

a support base;
a stop at one end of said base and defining a reference point against which one end of said blank abuts;
thickness sensing means supported on said base for indicating the thickness of said blank, said thickness sensing means including an output member positioned by said blank;
indicator means operatively associated with said thickness sensing means for indicating when the ratio of the change in length to the change in thickness is equal to the predetermined constant; and
multiplier means operatively connected to said indicator means and engaged by the end of said blank opposite said reference point for positioning said indicator means relative to said output member of said thickness sensing means so that said indicator means is shifted from an initial position to a second position through a distance equal to the reciprocal of said constant times the change in length of said blank from said standard blank, said output member of said thickness sensing means shifting an equal distance if the ratio of change in length from said standard to the change in thickness from said standard equals said constant.

14. A gauge as defined by claim 13 wherein said multiplier means comprises:
a block defining a first bore and a second bore intersecting said first bore at a right angle thereto; a first piston slidable with said first bore and having a first cross-sectional area; a second piston slidable within said second bore and having a second cross-sectional area; and an imcompressible fluid medium within said bores and contacted by said pistons, the ratio of the cross-sectional area of said first piston to the cross-sectional area of said second piston being equal to the reciprocal of said constant, said first piston abutting said blank at its end opposite said reference point.

15. A gauge as defined by claim 14 wherein said constant equals pi.

16. A gauge as defined by claim 13 wherein said multiplier means comprises a first block having an angled camming surface a second block supported above said first block for vertical movement only and including a cam follower surface sliding in said camming surface, and wherein the tangent of the angle of said camming surface from horizontal is equal to the reciprocal of said constant.

17. A gauge as defined by claim 16 wherein said constant equals pi.

* * * * *